(12) United States Patent
Andersson et al.

(10) Patent No.: US 8,337,761 B2
(45) Date of Patent: Dec. 25, 2012

(54) PARTICULATE FILTRATION DEVICE

(75) Inventors: Lennart Andersson, Varberg (SE);
Jonas Edvardsson, Mölndal (SE);
Edward Jobson, Romelanda (SE); Heije Westberg, Hisings Backa (SE); Per-Olof Larsson, Helsingborg (SE); Owe Mars, Höganäs (SE); Jörgen Knuth-Nielsen, Eldsberga (SE)

(73) Assignees: Volvo Technology Corp., Göteborg (SE); Höganäs AB, Höganäs (SE)

( * ) Notice: Subject to any disclaimer, the term of this patent is extended or adjusted under 35 U.S.C. 154(b) by 343 days.

(21) Appl. No.: 12/809,612

(22) PCT Filed: Dec. 21, 2007

(86) PCT No.: PCT/EP2007/011365
§ 371 (c)(1),
(2), (4) Date: Sep. 3, 2010

(87) PCT Pub. No.: WO2009/080084
PCT Pub. Date: Jul. 2, 2009

(65) Prior Publication Data
US 2011/0027136 A1 Feb. 3, 2011

(51) Int. Cl.
B01D 50/00 (2006.01)

(52) U.S. Cl. ...................................................... 422/177

(58) Field of Classification Search .................. 422/177, 422/180; 55/489, 521, 498
See application file for complete search history.

(56) References Cited

U.S. PATENT DOCUMENTS

| 4,589,983 A | 5/1986 | Wydevan |
| 5,019,142 A | 5/1991 | Waschkuttis |
| 6,126,833 A * | 10/2000 | Stobbe et al. .................. 210/650 |
| 6,835,224 B2 * | 12/2004 | Cheng ............................. 55/428 |
| 2007/0277516 A1 | 12/2007 | Dubots |

FOREIGN PATENT DOCUMENTS

| EP | 1435436 A | 7/2004 |
| WO | 03069139 A | 8/2003 |
| WO | 2005003528 A | 1/2005 |

OTHER PUBLICATIONS

International Search Report for corresponding International Application PCT/EP2007/011365.
International Preliminary Report on Patentability for corresponding International Application PCT/EP2007/011365.

* cited by examiner

Primary Examiner — Tom Duong
(74) Attorney, Agent, or Firm — WRB-IP LLP

(57) ABSTRACT

A particulate filtration device includes a filter with a feed inlet side for a feed gas and an filtrate outlet for a filtrate, feed gas channels and filtrate channels, and one or more diaphragms between the feed inlet side and the filtrate outlet. Opposite to the feed inlet side a particulate outlet is arranged with a collector compartment attached to the particulate outlet for collecting particulates retained in the feed gas channels.

24 Claims, 4 Drawing Sheets

PARTICULATE FILTRATION DEVICE

BACKGROUND AND SUMMARY

The invention relates to a particulate filtration device.

Particulate filters are becoming more and more a standard part in exhaust after treatment for diesel engines. The most commonly used particulate filters for heavy duty engines are based on ceramic substrates, such as cordierite or silicon carbide (SiC). They are usually made as monolith substrates, with a large number of parallel, single ended channels where a part of the channels is closed at the inlet of the monolith, and part of the channels are closed at the outlet of the monolith. The particulates are filtered when the exhaust gas is forced through the channel walls of the substrate. The efficiency is usually high, above 90%. The collected particulates are removed from the filter by oxidation. The oxidation may occur at lower temperatures starting at about 250° C. if NO2 is present in the exhaust gases, or by oxygen at higher temperatures of about 600° C. The temperature control during high temperature oxidations is critical for the durability of the particulate filter. The particulate filter is especially sensitive to local temperature maxima. Such local temperature maxima can be caused by irregular soot collection or by imperfect regeneration procedures of the filter. Some of the collected soot cannot be removed by oxidation, and the ashes left after the regeneration must be handled separately, mainly manually by demounting the muffler and washing the filter.

Filtration devices described above have been commercially available for over 20 years. In U.S. Pat. No. 4,589,983 A several ways of putting together corrugated and flat filter materials are shown. It is proposed to stack corrugated filter sheets where fluid channels of successive sheets are oriented orthogonally to each other with a 90° rotation. A feed gas enters at a feed gas side and a filtrate, e.g. filtered exhaust gas if raw exhaust gas is the feed gas, exits the stack at sides orthogonal to the feed gas side.

In U.S. Pat. No. 6,126,833 A an arrangement is disclosed with small ceramic monoliths to get a cross flow filtration where the filtrate can move to the outside of the module.

An example of stacking sintered metal sheets to a particulate filter is given in EP 1 132 582 A1. Large sheets with a central opening are welded together in an accordion like style, where exhaust gas is directed from the outside through the porous sheets into the inside opening. The retentate, i.e. soot and ashes, is collected in a container which is arranged below the filter sheets.

It is desirable to provide a particulate filtration device which allows for easy removal of soot and ashes from the filter.

According to an aspect of the invention, a particulate filtration device comprising a filter with a feed inlet side for a feed gas and an filtrate outlet for a filtrate, further comprising feed gas channels and filtrate channels and one or more diaphragms between the feed inlet side and the filtrate outlet. Opposite to the feed inlet side a particulate outlet is arranged with a collector compartment attached to the particulate outlet for collecting particulates retained in the feed gas channels. Favourably, a particulate outlet is arranged opposite to the feed inlet side and the filtrate outlet is arranged crosswise to the feed inlet side. Preferably, the diaphragms between the feed gas and filtrate channels are oriented perpendicular to the stack direction. The filter body can exhibit a cube-like shape. Preferably, the filtrate outlet can be provided at two opposite sides of the filter. The cross-flow arrangement of the filter yields a compact and efficient filtration device.

A collector compartment is arranged at the particulate outlet for collecting particulates retained in the feed gas channels. The collector compartment collects the ashes formed during regeneration of the filter. The filtration device is preferably used in automotive applications, particularly in vehicles equipped with diesel engines. Thus, the compartment can be adapted in its size to hold ashes formed at least in between regular service intervals. Particularly, the volume of the collector compartment can be designed to hold ashes in between several service intervals of the vehicle. The feed gas, i.e. the exhaust of the engine in an automotive ambient, enters the feed gas channels of the filtration device and flows through the gas-permeable diaphragms into the filtration channels and exits the filtration device. Ashes and soot carried in the feed gas is retained by the diaphragms. The soot can be burned by NO2 and/or O2, while the ash is slowly moved by viscous forces to the end of the feed channels into the collector compartment. Favourably, the channels are of considerably size with cross-section areas in the range of several mm2.

Favourably, the collector compartment can be connected releasably to the filter. Removing the ashes out of the filtration device and cleaning the collector compartment can be done in a very simple way.

According to a preferred embodiment, the collector compartment can be mounted geodetically below the filter when the filtration device is mounted in its working ambient. For instance, the filter and the collector compartment attached can be oriented vertically instead of horizontally, with the feed inlet side at the upper side and the collector compartment at the lower side. Additionally to the viscous forces which drives the ash to the end of the feed channels into the collector compartment, in the proposed arrangement this driving force is supported by gravity. Preferably, feed gas is deflected with respect to the feed inlet side, for example by providing a duct which is inclined to the feed inlet side of the filter.

Preferably, the feed gas can move along feed gas channels arranged in feed gas plates and/or the filtrate can move along filtrate channels arranged in filtrate plates. The arrangement is a simple design. Particularly, the channels of successive plates can be aligned orthogonally.

According to an advantageous embodiment the plates are stacked in a stack direction and separated by gas-permeable diaphragms. This results in a compact and simple filter design.

In a further preferred embodiment, a catalytic material can be provided in one or more or all feed gas channels. Preferably, the one or more or all feed gas channels can provide an oxidation catalyst. The catalytic material can be preferably applied as a catalytic layer. By way of example, the catalyst can increase the amount of NO2 thus improving a continuous filter regeneration at relatively low temperatures and/or increasing a NOx removal efficiency. Thereby, oxidation of soot in the feed gas channels can be improved.

Additionally or alternatively, a catalytic material can be provided in the one or more filtrate gas channels. Preferably, one or more or all filtrate channels can provide a catalyst for reducing nitrogen oxides (NOx). An alternative catalyst can be a catalyst which reduces NO2 to NO which can be preferred especially if a high NO2 content is needed for soot oxidation. The catalytic material can be preferably applied as a catalytic layer.

One or more separator walls between gas channels within one plate can be gas tight. In such a case the feed gas can only penetrate the diaphragm between the feed channels and the filtrate channels. A preferred embodiment of the plates is a comb-like cross-section with a multitude of parallel separator walls which are on one side connected with a plate-like porous body which is forming the bottom of the gas channels. The individual plates are open when seen from above with a porous bottom and the parallel separator walls standing upright on the bottom. The bottom formed of porous material serving as diaphragm which separates the filtrate from the retentate when the feed gas flows through the diaphragm. Plates of this type can be fabricated as monolithic bodies. Stacking a plurality of such plates on top of each other yields an arrangement with channels where the bottom of the successive plate forms the cover of the channels of the previous plate. Thus, bottom and cover of a channel are permeable for the feed gas. In this embodiment, the hydraulic diameter of the channels can be relatively large resulting in a lower pressure drop or, alternatively, can have a large diaphragm area per volume at a given hydraulic diameter. The hydraulic diameter is a commonly used term when handling flow in noncircular, tubes and channels. It can be defined as four times the cross sectional area of the channel divided by the fluid-wetted perimeter of the channel. A fluid is defined as a substance that continually deforms (flows) under an applied shear stress regardless if how small the applied stress. All liquids and all gases are fluids.

An alternative embodiment for the plates is to use corrugated foils between diaphragm plates. This embodiment is very advantageous in combination with an oxidation catalyst in the feed gas channels and/or a NOx-reducing catalyst in the filtrate channels, as this structure is less sensitive to pressure drops. The catalyst coating can be arranged on the corrugated foils instead of the diaphragm.

Additionally or alternatively, one or more or all of the separator walls between gas channels within one plate can act as diaphragms. This allows to manufacturing the plates of the filter in one piece out of the same material making the manufacture fast and economical. Additionally, in case the flow is blocked in one or more channels, the fluid can flow through the permeable separator walls from a blocked channel to an open channel resulting in a homogenized fluid flow between the channels in a plate.

Additionally or alternatively, one or more separator walls between gas channels within the same plate can be perforated. A fluid flow in the channels can be redistributed if parts of the filter are suffering from larger pressure drops caused, e.g. by an inhomogeneous distribution of the particulates retained by the diaphragms.

According to an advantageous embodiment, an injection unit can be coupled to the filter in direct fluid connection with the filtrate channels. Preferably, the injection unit can replace one filtrate outlet. The injected medium can be a reducing agent for NOx removal such as ammonia or urea or another ammonia carrier, which is typically used for ammonia-SCR (SCR=selective catalytic reduction). The injection medium can also be fuel used for reducing NOx in a hydrocarbon-SCR process (HC-SCR) or for reducing NO2 partly or completely to NO.

A part of the feed gas favourably can be redirected to the injection unit as driving gas for an injected medium. An appropriate amount of redirected feed gas can be in the range of up to 15 vol. %, preferably up to 10 vol. %. The amount of redirected feed gas can be adjusted to provide enough energy and residence time to allow evaporation and/or decomposition of the injected medium. Preferably, a fluid conduit is provided between the downstream end of the feed gas channels and the injection unit. The amount of redirected feed gas can easily be adapted by the cross-section of the gas conduit attached to the feed gas outlet. The redirected gas can supply energy to the reducing-agent droplets for evaporation and/or decomposition as well as a driving force towards the filter.

The fluid conduit can be arranged juxtaposed to an interface between the filter and the injection unit. This yields an advantageous pre-heating of the injected medium. The injector side of the filter can act as a heat exchanger and cool the feed gas and the filtrate, respectively, thus heating the injected medium. If the temperature of the feed gas is too low to yield a proper evaporation and/or decomposition of the injected reducing agent, a separate heater can be coupled to the arrangement. For example, urea needs about 400° C. as working temperature yielding a reliable decomposition into the desired products. If the heat from the exhaust can be used to preheat the injected medium, less energy is required for heating.

Preferably, a particulate filter can be provided in the fluid conduit. The filter can be of the same type as the filter described above, which is a wall-flow type. The filter can use the same collector compartment for the ash. However, any kind of filter can be used in the fluid conduit, such as a flow-through type etc.

Further, a heater can be coupled to the fluid conduit. The heater can preferentially be an electric heater. Generally, a catalytic burner or a flame burner can also be employed.

In a preferred embodiment, the channel plates and/or the diaphragms can be made of metal. Using metallic materials, particularly sintered metal, the filter exhibits a higher thermal conductivity and a higher heat capacity than a ceramic material, thus preventing thermal inhomogeneity and hot spots. Metallic materials also exhibit better mechanical properties compared to ceramics.

Generally, the diaphragms can also be made of any porous material. Using porous metal, i.e. sintered metal, yields a high thermal conductivity, thus avoiding local thermal spots.

BRIEF DESCRIPTION OF THE DRAWINGS

The present invention together with the above-mentioned and other advantages may best be understood from the following detailed description of the embodiments, but not restricted to the embodiments, wherein is shown schematically in.

Figure 1A:
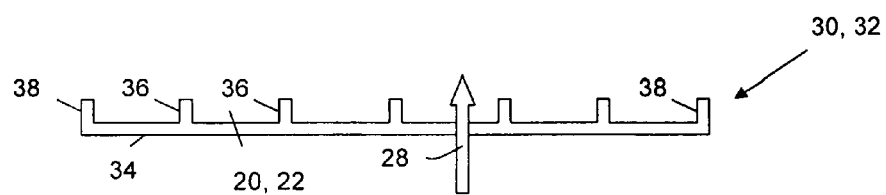
FIG. 1a, b a side view (FIG. 1a) and a perspective view of a first preferred filter (FIG. 1h) of a filtration device according to the invention.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION

Figure 1B:
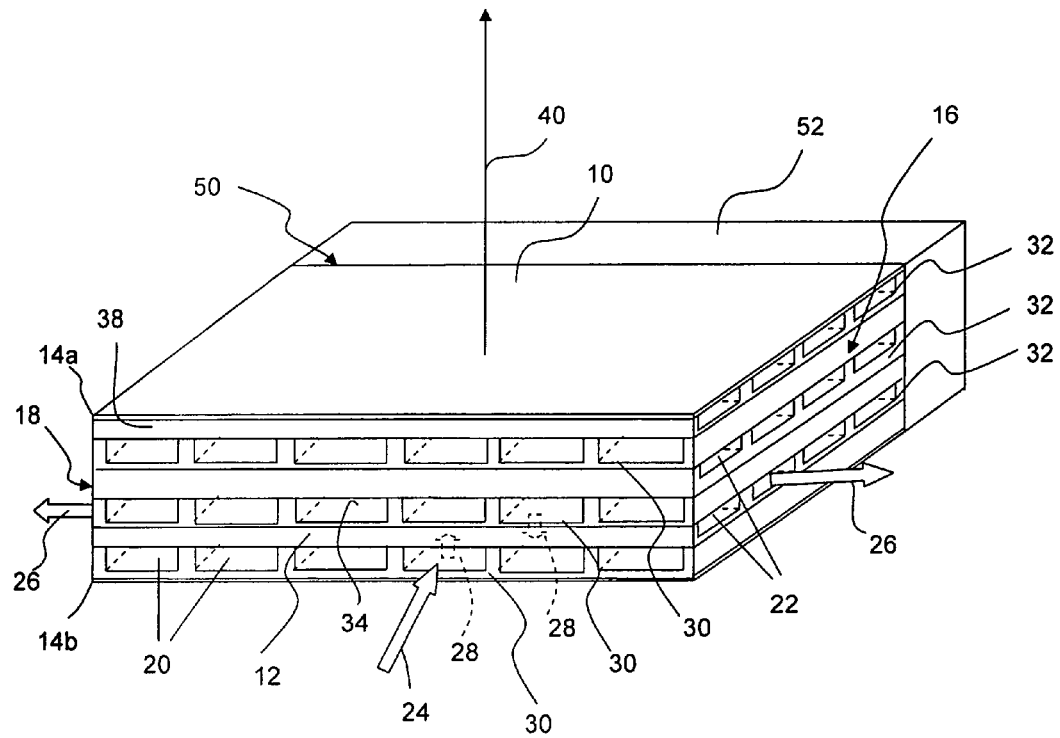

A preferred filter 10 of a filtration device (not shown) according to the invention is depicted in FIGS. 1a and 1b. The filter 10 has a feed inlet side 12 for a feed gas and a filtrate outlet 16, 18 for a filtrate. For instance, in case of raw exhaust gas as the feed fluid, the filtrate is exhaust gas without carbon particles. The feed gas flows along feed gas channels 20 arranged in feed gas plates 30 and the filtrate flows along filtrate channels 22 arranged in filtrate channel plates 32. The plates 30, 32 are stacked on top of each other in an alternating manner in a stack direction 40 and separated by gas-permeable diaphragms 34, wherein the channels 20, 22 of successive channel plates 30, 32 are aligned orthogonally, i.e. plates 30, 32 as shown in FIG. 1a are rotated by 90° in each stack level.

The plates 30, 32 are of comb-like profile with separator walls 36 (only a few are denoted with their reference numerals) sitting on a porous base plane acting as diaphragm 34. This yields parallel channels 20, 22 (only a few are denoted with their reference numerals) separated by the separator walls 36. At the outermost ends of the plate 30, 32, end walls 38 are arranged which may be gas-tight or porous. In the case of gas-tight end walls 38 these can constrict the feed gas, so the feed gas enters the filter 10 only through the channels 20. In case of porous end walls 38, these can be made from the same material as the diaphragm 34. The individual separator walls 36 can be gas-tight or gas-permeable, e.g. made of the same material as the diaphragm 34 or can even be perforated. The group of individual separator walls 36 of one comb-like profile can be divided in sub-groups, for instance one sub-group comprising separator walls which are gas-tight and the other sub-group of separator walls which are gas-permeable. The individual separator walls 36 of the two sub-groups can be arranged in certain orders (for instance in an alternate order wherein a gas-tight separator wall is followed by a gas-permeable separator wall). Other order arrangements are also possible. The stacked plates 30, 32 can be welded, sintered etc. to yield a stable connection between the plates 30, 32 or can be mechanically pressed together. The plates 30, 32 can be fabricated as monolithic bodies.

The channels located in the corner of the filter 10 may also be closed off by the material used for mounting the filter 10 into the filtration device 100, i.e. a fibrous mat or metal plates.

If gas-permeable separator walls 36 are employed, feed gas can flow not only through the diaphragms 34 into the filtrate channels 22 but also to neighbouring channels 20. This is advantageous if individual feed gas channels 20—or even filtrate channels 22—should become blocked during operation. Then the flow of the fluids can be homogenized despite the blocked channels. On the other hand, gas tight separator walls 36 can be made very stable.

As can be seen in FIG. 1b, the stack is mounted between two gas-tight endplates 14a, 14b. On top of a first feed gas plate 30 with channels 20 (only a few are denoted with their reference numerals) a second filtrate plate 32 is mounted with its filtrate channels 22 orthogonal to the feed gas channels 20, followed by a third feed gas plate 30, followed by a fourth filtrate plate 32, followed by a fifth feed gas plate 30, followed by a sixth feed gas plate 32. Feed gas, i.e. exhaust of a diesel engine carrying unburned carbon (soot), which is indicated in FIG. 1b by an arrow 24, flows into the feed gas channels 20 and enters the filtrated channels 22 through the diaphragms 34 (the flow direction is indicated by arrows 28) which separate the channels 20, 22 of successive plates 30, 32.

A particulate outlet 50 is arranged opposite to the feed inlet side 12 and the filtrate outlet 16, 18 is arranged crosswise to the feed inlet side 12. The flow of the filtrate is indicated by arrows 26. A collector compartment 52 is arranged at the particulate outlet 50 for collecting particulates retained in the feed gas channels 20.

The channels 20, 22 are not blocked by a specific stopper to force the feed gas through the diaphragms 34 and are usually open along their channel lengths. As the particulate outlet 50 is closed by the collector compartment 52, feed gas can only leave the filter by penetrating through the diaphragms 34 or porous end walls 38.

Preferably, the collector compartment 52 is releasably connected to the filter 10 and can be demounted for removing the collected ashes from time to time. In the embodiment shown, the collector compartment 52 is on the same level as the feed gas inlet 12, yielding a horizontal arrangement as shown. However, the collector compartment 52 can alternatively be mounted geodetically below the filter 10 when the filtration device is in its mounted state, e.g. in an exhaust gas after treatment system of a vehicle. For instance, in the filter 10 with the collector compartment 52 attached to the particulate outlet 50 as shown can be tilted to a vertical arrangement (not shown) so that the collector compartment 52 is geodetically below the filter 10, and a duct can be provided for the feed gas in front of the feed inlet side 12 to deflect the feed gas flow from a horizontal flow outside the filter 10 to a vertical flow into the filter 10.

The filter 10 exhibits a cube shape. The feed gas inlet 12 is on the cube front face, whereas two filtrate outlets 16, 18 are provided at two opposite sides of the filter 10 which are cube sidewalls. The particulate outlet 50 is arranged on the cube face opposite to the feed gas inlet 12.

Soot which sticks to the diaphragms 34 is oxidized and ash is transported via viscous forces and/or gravity to the collector compartment 52 as described above The plates 30, 32 can be made of sintered material which can be a ceramic material or, particularly preferred, metallic material. It is possible to provide a catalyst in the feed gas channels 20 and/or in the filtrate gas channels 22.

Figure 2A:
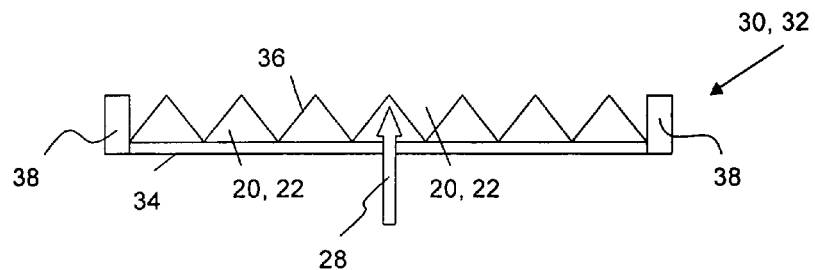
FIG. 2a, b a side view (FIG. 2a) and a perspective view of a second preferred filter (FIG. 2b) of a filtration device according to the invention.
Figure 2B:
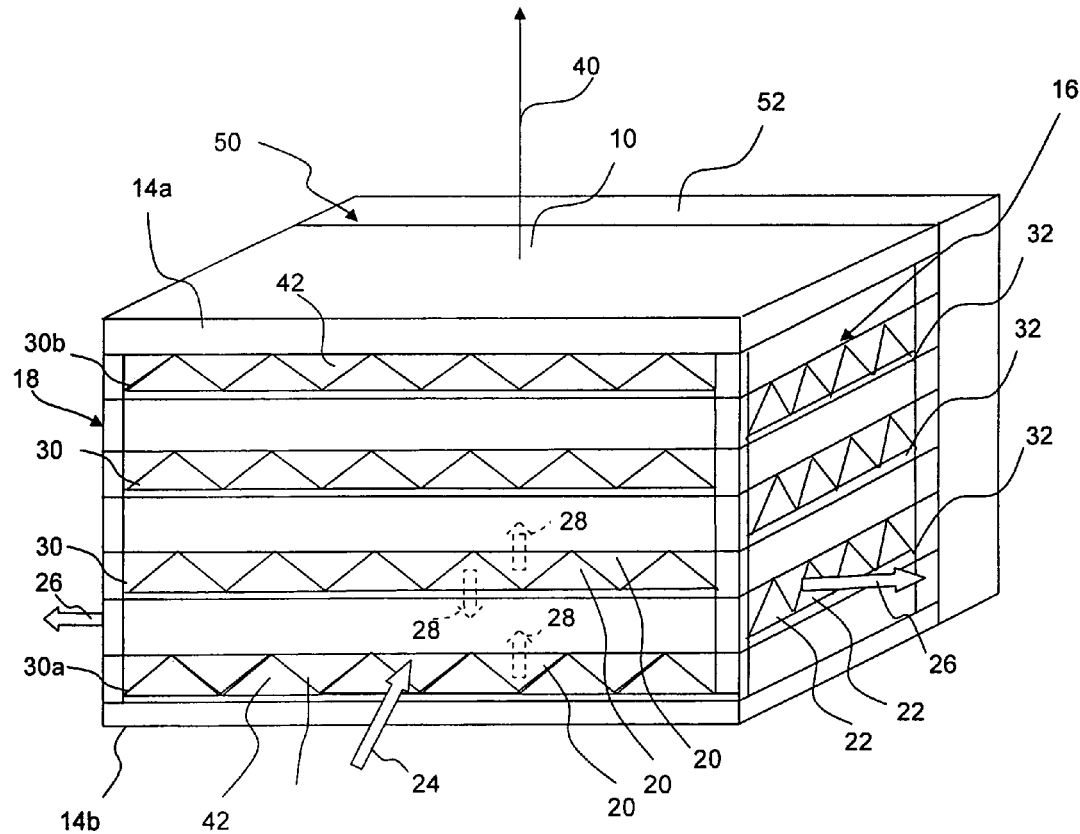

FIGS. 2a and 2b show another embodiment of a preferred filter 10 consisting of or comprising a stack of plates 30, 32.

As can be seen in FIG. 2a, the plates 30, 32 are formed of two parts, a diaphragm 34 and a corrugated foil, e.g. with a triangular cross-section, which acts as spacer between the diaphragms 34 of successive plates 30, 32 in the stack and which also defines parallel channels 20, 22 in each plate 30, 32 by forming separator walls 36. Each plate 30, 32 exhibits end walls 38 which are may be gas-tight or gas-permeable, e.g. made of diaphragm material. By using gas-tight end walls 38, feed gas can enter the filter only through the feed gas channels 20.

As can be seen in FIG. 2b, the stack is mounted between two gas-tight endplates 14a, 14b. On top of a first feed gas plate 30a with channels 20 (only a few are denoted with their reference numerals) a second filtrate plate 32 is mounted with its filtrate channels 22 orthogonal to the feed gas channels 20, followed by a third feed gas plate 30, followed by a fourth filtrate plate 32, followed by a fifth feed gas plate 30, followed by a sixth filtrate plate 32, followed by a seventh feed gas plate 30b. The lowest and the uppermost feed gas plates 30a, 30b can be equipped with stoppers 42 as shown, or, if no stoppers 42 are provided, the corrugated foils 36 can be preferably gas-permeable to avoid feed gas being caught in dead end channels 20 in these outermost plates 30a, 30b.

Feed gas, i.e. exhaust of a diesel engine carrying unburned carbon (soot), which is indicated by an arrow 24, flows into the feed gas channels 20 and enters the filtrated channels 22 through the diaphragms 34 (the flow direction is indicated by arrows 28 with broken lines) which separate the channels 20, 22 of successive plates 30, 32. Filtrate exits the filter 10 at the filtrate outlet 16, 18. The flow of the filtrate is indicated by arrows 26.

As in FIGS. 1a, 1b, a particulate outlet 50 is arranged opposite to the feed inlet side 12, and the filtrate outlets 16, 18 are arranged crosswise to the feed inlet side 12. A collector compartment 52 is arranged at the particulate outlet 50 for collecting particulates retained in the feed gas channels 20.

Except for the outermost plates 30a, 30b, the channels 20, 22 are not blocked by a specific stopper to force the feed gas through the diaphragms 34 and are usually open along their channel lengths. As the particulate outlet 50 is closed by the collector compartment 52, feed gas can only leave the filter by penetrating through the diaphragms 34.

Figure 3:
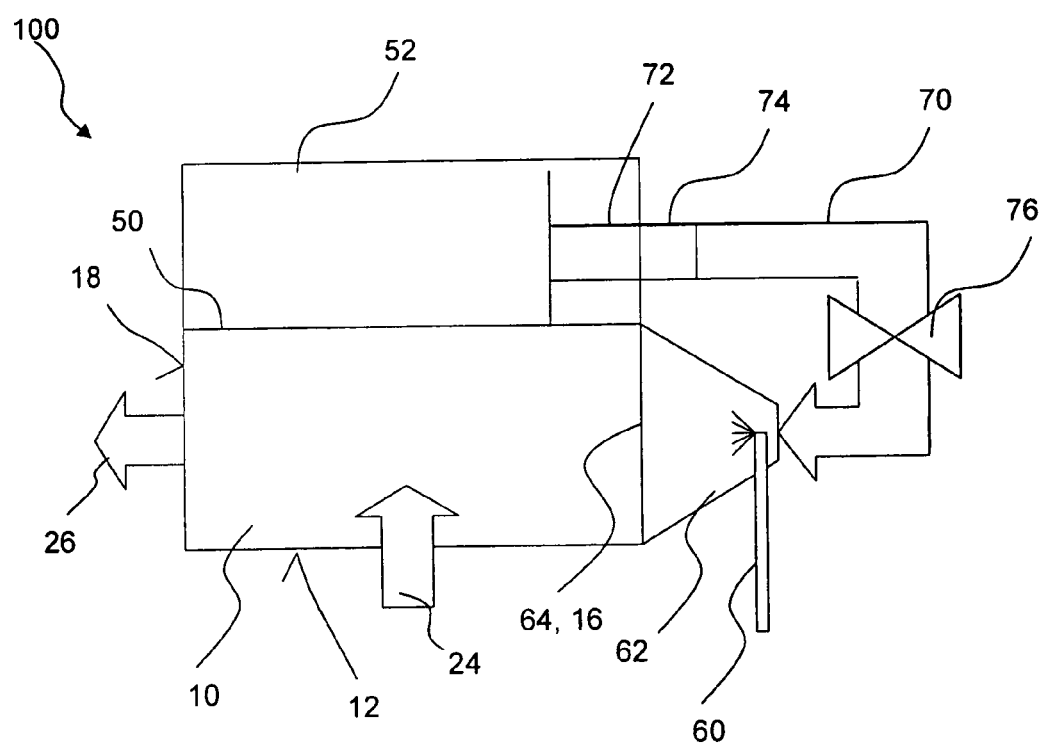
FIG. 3 a top view of a first embodiment of a preferred filtration device with feed gas redirected to an injection unit attached to a filter.
Figure 4:
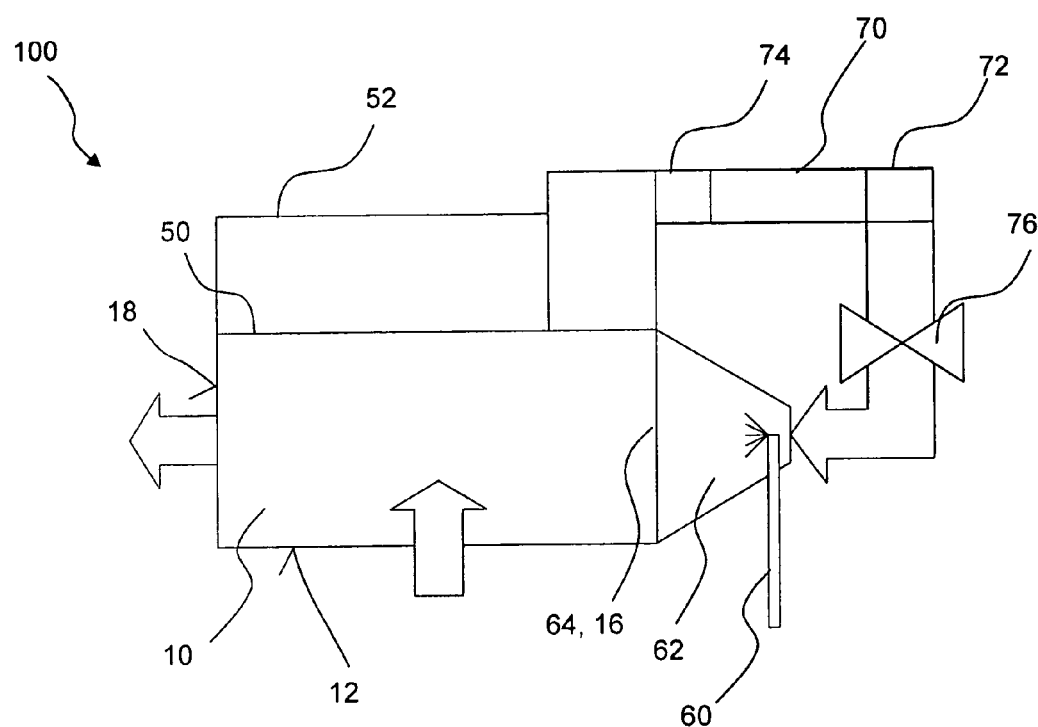
FIG. 4 a top view of a second embodiment of a preferred filtration device with feed gas redirected to an injection unit attached to a filter.

Referring now to FIG. 3 and FIG. 4, preferred filtration devices 100 are illustrated as top view on the filter 10.

An injection unit 60 is coupled to the filter 10 in direct fluid connection with the filtrate channels 22. For a description of the filter 10 reference is made to the embodiments in FIGS. 1a, 1b and FIGS. 2a, 2b in order to avoid unnecessary repetitions. The injection unit 60 replaces one filtrate outlet, e.g. filtrate outlet 16.

A chamber 62 is mounted to the filtrate outlet side 16 which has an inlet for the injection unit 60 and for a part of the feed gas forming an interface 64 between the injection unit 60 and the filter 10. A part of the feed gas is redirected to the injection unit 60 as driving gas for an injected medium. To accomplish this, a fluid conduit 70 (symbolized as a big arrow) is provided between the downstream end of the feed gas conduits 20 and the injection unit 60.

The fluid conduit 70 is arranged juxtaposed to the interface 64 between the filter 10 and the injection unit 60. Due to this arrangement, the interface 64 can have the effect of a heat exchanger between the hot feed gas and the injected medium, which is preferably urea, ammonia or another ammonia carrier and/or hydrocarbons.

A particulate filter 72 is provided in the fluid conduit 70 as well as a heater 74, particularly an electric heater. The additional filter 72 in the conduit 70 is arranged upstream of the heater 74 in FIG. 3 and downstream of the heater 74 in FIG. 4.

The amount of redirected feed gas is preferably between a few vol. % up to 15 vol. %, preferably up to 10 vol. % of the feed gas. The device can also be designed to handle much higher parts of the feed gas in the redirection fluid conduit 70. The flow through the fluid conduit 70 can be controlled for example by an appropriate valve 76. The valve 76 can control the redirected flow passively or actively.

In FIG. 3, the filter 72 can be of the same type as the filter 10 and even use the same collector chamber 52 for collecting ash.

In the arrangement of FIG. 4, particularly with a wall-flow filter, the redirected part stream of the feed gas can also be used for handling oxygen based regeneration for the engine or vehicle types that sometimes run in conditions where the NO2-based soot burning is not sufficient for regeneration of the filter 10.

Ash can easily be removed and doesn't contribute to an increase in pressure drop between regeneration of the particulate filter 10. When using a sintered metal diaphragm, local hot spots are less critical. It is possible to integrate several functions, e.g. oxidation catalyst, particulate filter, injection of reducing agent, DENOx (partly) and heat exchanger, into one unit (filtration device 100), making packaging less difficult. Sintered porous metal sheets as plates 30, 32 (FIG. 1a, FIG. 2a) exhibit a much higher strength than corresponding ceramic filter sheets. A sintered metal diesel particulate filter solution with integrated functions has the potential to give a cheaper total solution than a ceramic diesel particulate filter solution. Coating with catalytic material may be achieved without increasing the pressure drop across the filter, e.g. when applied to the supporting channel walls 36, particularly in the embodiment with corrugated foils. It is easy to coat the inlet channels 20 and outlet channels 22 with different coatings.

The invention claimed is:

1. A particulate filtration device comprising a filter with a feed inlet side for a feed gas and a filtrate outlet for a filtrate, further comprising feed gas channels and filtrate channels and one or more diaphragms between the feed inlet side and the filtrate outlet, wherein opposite to the feed inlet side a particulate outlet is arranged with a collector compartment attached to the particulate outlet for collecting particulates retained in the feed gas channels, characterized in that an injection unit is coupled to the filter in direct fluid connection with the filtrate channels, wherein the filtrate outlet is provided at two opposite sides of the filter, and the injection unit replaces one filtrate outlet, and that a part of the feed gas is redirected to the injection unit as driving gas for an injected medium.

2. The device according to claim 1, wherein the collector compartment is releasably connected to the filter.

3. The device according to claim 1, wherein with the filter in its mounted state the collector compartment is mounted geodetically below the filter.

4. The device according to claim 3, wherein the feed gas is deflected with respect to the feed inlet side.

5. The device according to claim 1, wherein the feed gas moves along feed gas channels arranged in feed gas plates.

6. The device according to claim 1, wherein the filtrate moves along filtrate channels arranged in filtrate plates.

7. The device according to claim 5, wherein the channels of successive plates are aligned orthogonally.

8. The device according to claim 5, wherein the filtrate moves along filtrate channels arranged in filtrate plates, and the plates are stacked in a stack direction and separated by gas-permeable diaphragms.

9. The device according to claim 1, wherein a catalytic material is provided in one or more feed gas channels.

10. The device according to claim 9, wherein the one or more feed gas channels provide an oxidation catalyst.

11. The device according to claim 1, wherein a catalytic material is provided in one or more filtrate gas channels.

12. The device according to claim 11, wherein the one or more filtrate channels provide a catalyst for reducing nitrogen oxides.

13. The device according to claim 11, wherein the catalyst is provided on the diaphragm and/or on the separator walls.

14. The device according to claim 1, characterized in that wherein the diaphragms (34) between the feed gas and filtrate channels (20,22) are oriented perpendicular to the stack direction.

15. The device according to claim 1, wherein separator walls are arranged between the channels within one plate and that one or more of the separator walls are gas-tight.

16. The device according to claim 1, wherein separator walls are arranged between the channels within one plate and that one or more of the separator walls act as diaphragms.

17. The device according to claim 1, wherein separator walls are arranged between the channels within one plate one or more separator walls between channels within the same plate are perforated.

18. The device according to claim 1, wherein a valve is provided for adjusting an amount of the feed gas which is redirected to the injection unit.

19. The device according to claim 18, wherein a fluid conduit is provided between the downstream end of the feed gas channels and the injection unit (60).

20. The device according to claim 19, wherein the fluid conduit is arranged juxtaposed to an interface between the filter and the injection unit.

21. The device according to claim 18, wherein a particulate filter is provided in the fluid conduit.

22. The device according to claim 18, wherein a heater is coupled to the fluid conduit.

23. The device according to claim 1, wherein the channel plates are made of metal.

24. The device according to claim 1, wherein the diaphragms are made of sintered metal.

* * * * *